United States Patent [19]

Carolan

[11] 4,241,567
[45] Dec. 30, 1980

[54] LAWN MOWER SAFETY SHIELD

[75] Inventor: Donald L. Carolan, Beaver Dam, Wis.

[73] Assignee: Deere & Company, Moline, Ill.

[21] Appl. No.: 12,966

[22] Filed: Feb. 21, 1979

[51] Int. Cl.³ ............................................. A01D 53/00
[52] U.S. Cl. ...................................... 56/17.4; 56/320.1
[58] Field of Search ...................... 56/17.4, 320.1, 320.2

[56] References Cited

U.S. PATENT DOCUMENTS

| | | | |
|---|---|---|---|
| 2,963,842 | 12/1960 | Estes | 56/320.1 |
| 3,190,061 | 6/1965 | Gilbertson | 56/17.4 |
| 3,378,995 | 4/1968 | Welsh | 56/320.1 |
| 3,432,183 | 3/1969 | Groll | 56/320.1 |
| 3,727,386 | 4/1973 | Jesperson et al. | 56/17.4 |
| 3,851,452 | 12/1974 | Brochs | 56/12.4 |
| 3,927,517 | 12/1978 | Ramaker et al. | 56/17.4 |
| 4,030,277 | 6/1977 | Christopherson | 56/320.1 |

Primary Examiner—Paul J. Hirsch

[57] ABSTRACT

A safety shield composed of an extruded sheet of material with upper, lower and intermediate tubular portions. The upper tubular portion is mounted on the rear axle of a lawn mower. Notches are provided in the sheet that extend from the upper tubular edge downwardly into the sheet and terminate above the intermediate tubular portion. The notches permit relative free fore-and-aft swinging of the entire shield on the axle without creating interference with portions of the mower housing. The intermediate and lower tubular portions have stiffener rods extending therethrough which restrict distortion of the shield and which may contact the lower extremities of the mower housing.

7 Claims, 3 Drawing Figures

LAWN MOWER SAFETY SHIELD

BACKGROUND OF THE INVENTION

It is heretofore been known to provide a rear shield on a lawn mower which is mounted directly on the transverse rear axle structure or a drive shaft extending to the respective rear wheels. In some instances this has been a flexible sheet of material such as, for example, is shown and described in U.S. Pat. No. 3,727,386. This patent shows a flexible sheet of material carried on a transverse rod with the lower edge or end of the material engaging the ground. There have also been instances where the rear shield is made of a metal plate in which the lower end of the metal plate engages, in many instances, the ground. The purpose of such shield is to prevent the insertion of an operator's foot under the mower and into contact with the rotating blade of the mower.

One of the problems that exists with respect to having a stiff metal sheet serve as the rear guard is that the operator of the mower often finds the shield a source of annoyance when backing. The guard will be inclined rearwardly due to the previous forward movement of the mower. When backing, if the lower end of the shield contacts a high level of ground or a foreign object, it will prevent backing and the operator must force the mower to rock about the upper pivot edge of the shield. In many instances this has been sufficiently annoying that the operator eventually secures the shield in an upper position or, in some instances, even removes it.

With respect to the flexible sheet of material, it eliminates the annoyance of making it difficult to reverse direction of the mower. However, since the material is flexible it reduces the degree of safety for the operator since a foot or other part of the anatomy which might be inserted from the rear of the mower may cause sufficient distortion of the shield so as to minimize the effective safety characteristic of the shield. Also, injury sometimes occurs due to material being thrown rearwardly by the blade and the flexible shield will yield such that the heavier materials will move by the shield by distorting it momentarily.

SUMMARY OF THE INVENTION

With the above in mind, it is the primary object of the present invention to provide a safety shield for a lawn mower which generally overcomes the objections to either of the aforementioned type of shield. The present shield is composed of an extruded sheet-like member having vertically spaced tubular portions. The upper tubular portion is mounted on the transverse axle shaft so that the remainder of the sheet-like member depends from the axle. Notches are cut from the upper edge of the sheet-like member in areas where interference might occur between the mower housing or parts when the shield swings fore-and-aft. The notches extend from the upper edge, through the upper tubular portion and terminate above the intermediate of the tubular portions. Thus, the shield is relatively free to swing fore-and-aft. The shield is made of a flexible polymeric material so that the shield will flex in the fore-and-aft direction. Metal stiffener rods are inserted in the intermediate and lower tubular portions to give transverse stiffness lengthwise of the flexible sheet or transverse of the mower. The relatively stiff tubular portions with their rod inserts contact the underside of the housing and prevent both the guard as well as a body portion from entering into the area of the rotating blades. Since the shield is flexible, there will be very little, if any, resistance to reversing the direction of the mower by the operator.

It is the further object of the present invention to provide a method of making and supporting a safety shield on a lawn mower which includes the steps of extruding a sheet of polymeric material so as to have vertically spaced tubular sections; forming notches in the upper portion of the sheet that extend through the upper tubular section in the areas where there would otherwise be interference between portions of the mower and the safety shield; the step of hanging the shield on the axle structure of the mower; and inserting stiffener rods through the lower of the vertically spaced tubular sections.

DESCRIPTION OF THE PREFERRED EMBODIMENT

Figure 1:
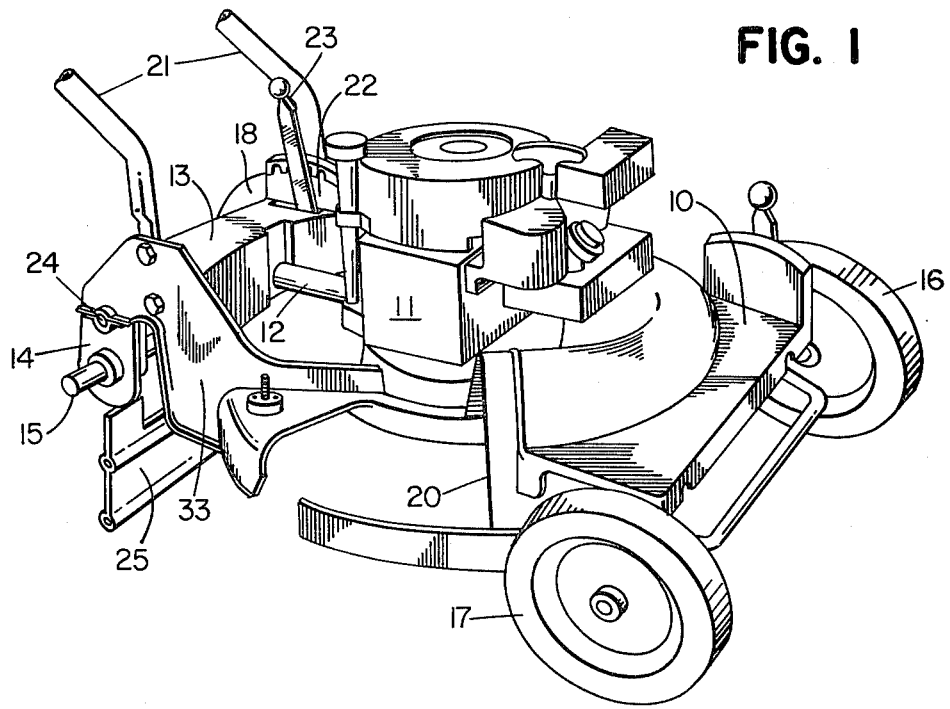
FIG. 1 is a front and right side perspective view of the lawn mower. For purposes of clarity, the right rear wheel of the mower is removed.

The lawn mower herein to be described has many of the characteristics of the lawn mower shown and described in more detail in a now pending application Ser. No. 969,459; filed 14 Dec. 1978 now U.S. Pat. No. 4,212,364, issued July 15, 1980. The mower is one, normally referred in the trade as a walk-behind mower. It has a deck or main housing 10 carrying an upright engine 11. A blade, not shown, is mounted on a vertical shaft of the engine and rotates in the conventional manner of a rotary mower. The engine 11 also drives a fore-and-aft horizontal drive shaft extending through a vertical housing portion 13 at the rear end of the deck 10 and which carries a pair of vertical bearing plates, one of which is shown at 14. Each bearing plate carries a bearing in which is journaled a axle drive shaft or rod 15. The rear axle 15 is drivingly connected to the drive shaft 12 through a suitable transmission, now shown. The deck or housing 10 is carried at its forward end by left and right-hand front wheels 16, 17. Rear wheels, shown partially at 18, 19, are provided on opposite ends of the axle 15 outboard of the respective bearing plates 14. The vertical bearing plates are carried on transversely aligned pivots 24 and a sector 22 and lever 23 is provided to raise and lower the entire deck 10 on the respective wheels 18, 19 and their axle 15. Details of the vertical adjusting structure are shown and described in the aforementioned application, Ser. No. 969,459. The deck plate 10 has an opening, indicated at 20, through which grass may be discharged from the mower. Typically, a bagging attachment may be mounted onto the deck in the area of the opening 20. A pair of arms 21 extend from opposite sides of the rear portion 13 of the mower upwardly and rearwardly to a cross piece, not shown, that an operator may use to control the mower.

Figure 2:
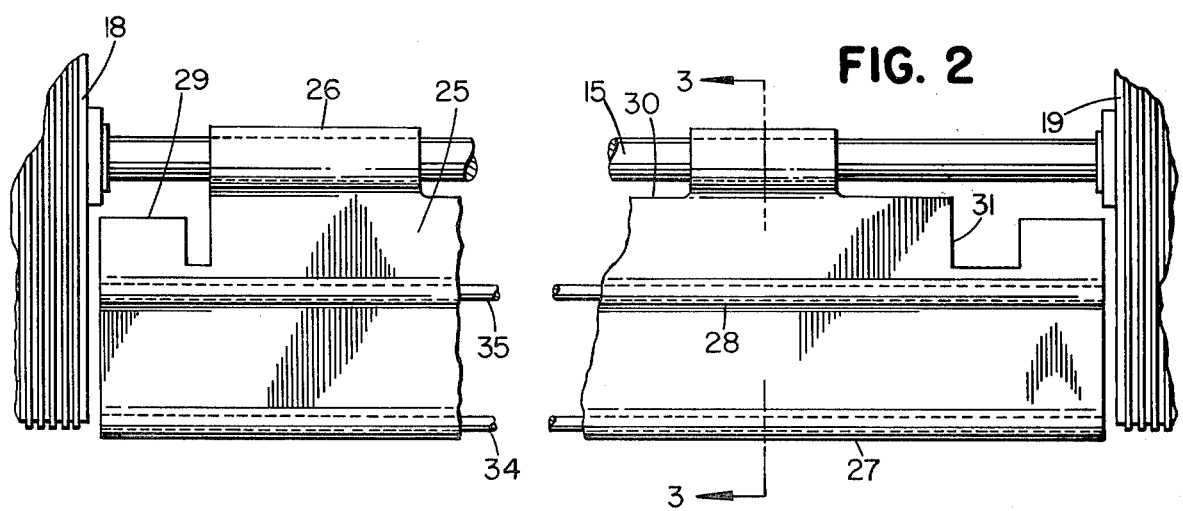
FIG. 2 is a rear view of the shield and axle structure.
Figure 3:
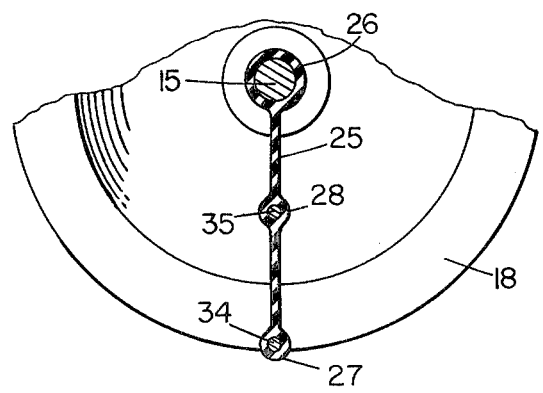
FIG. 3 is a sectional view taken substantially along the line 3—3 of FIG. 2.

Referring now to FIGS. 2 and 3, a safety shield 25 is provided that hangs or depends from the rear axle 15. The shield 25 is composed of a flexible polymeric sheet-like member. The member 25 is extruded in its sheet form with upper, lower and intermediate tubular portions 26, 27, 28. The sheet 25 is cut in lengths substantially equal to the distance between the internal surfaces of the respective rear wheels 18, 19 leaving, of course, some tolerance to avoid interference therewith. Notches, such as at 29, 30 and 31 are cut downwardly from the upper edge or end of the guard 25. The notches 29, 30, 31 are in locations so that the guard 25 will not contact portions of the mower that would otherwise be in the way of free swinging motion. For example, the notch 31 is located so as to prevent interference of the bearing hanger 14 and a vertical wall portion 33 of the housing 10. The notch 30 is located in the area of the transmission between the shaft 12 and axle 15 and the notch 29 is located in an area of the bearing hanger, not shown, adjacent the left rear wheel 18. The notches 29, 30, 31 all terminate above the central tubular section 28.

Metal stiffener rods 34, 35 are inserted in the lower and intermediate tubular portions 27, 28 respectively and extend substantially the full length of the guard 25. Therefore, they will contact the lower edges or extremities of the deck 10 and will prevent a foot or other body part of an operator from passing into the area of the rotating blade. The rods may be pinched or otherwise deformed in areas, preferably close to their ends, which will frictionally hold the rods 34, 35 against axial movement in the tubular portions 27, 28.

In operation when the mower is being driven forwardly, the forward movement of the mower will cause the shield 25 to be inclined downwardly and rearwardly from the rear axle 15. It will be noted in viewing FIG. 2 that the lower edge of the shield 25 is beneath the lower extremities of the respective wheels 18, 19. Since the shield 25 is mounted on the rear axle it will always hang or extend the desired length from the axle regardless of vertical adjustment of the mower deck with respect to the axle. When the mower is moved in reverse, the shield 25 moves from the rearwardly inclined position to the forwardly inclined position. Since the shield 25 is composed of flexible material, there will be little or no resistance of the shield to the reversal of directions. Should by accident a foot be inserted under the rear portion of the mower, the shield 25 will, of course, be forced forwardly. However, as the tubular portions 27, 28 contact the underside of the mower deck, the foot will be limited in its upward movement due to the structural strength of the rods 34, 35 to a level beneath the mower blade. Thus, it becomes extremely difficult to insert a foot from the rear of the mower into the area of the rotating blade. Should the mower be driven over a stone or foreign object which could be driven rearwardly by the blade, the transverse stiffness of the shield, due to the rods 34, 35, will tend to deflect a stone or foreign object when it is thrown against the shield 25. This, of course, limits the danger to an operator of flying objects being thrown rearwardly by the mower blade.

I claim:

1. A safety shield for a lawn mower having a transverse axle structure with ground wheels at opposite ends and elements on the mower adjacent the axle structure, said shield being composed of a polymeric sheet-like member having upper and lower horizontal tubular edges, said upper tubular edge receiving the axle structure so as to permit the sheet-like member to swing fore-and-aft, said member further having notches extending downwardly from said upper edge in fore-and-aft alignment with the aforesaid mower elements, said sheet-like member further having an integral and horizontal tubular section intermediate the upper and lower edges and beneath the lower extremities of the notches; and transverse rod elements extending through the tubular section and tubular lower edge for affording transverse stiffness to the safety shield.

2. A safety shield for a lawn mower having a housing supported at its rear end on ground wheels carried on opposite ends of a transverse axle structure and means for vertically adjusting the housing with respect to the wheels to permit raising and lowering of the mower cutting element with respect to the ground, said shield comprising: a polymeric sheet-like member having upper and lower tubular portions adjacent its upper and lower edges, the upper of which receives the axle structure so as to permit the sheet-like member to swing fore-and-aft, said sheet-like member further having notches extending downwardly from its upper edge and in fore-and-aft alignment with portions of the mower adjacent the axle structure so as to permit fore-and-aft swinging of the sheet-like member without interferring with said portions; and a stiffening means contained in the lower tubular member.

3. The invention defined in claim 2 in which the lower tubular portion and stiffener means extends the full length of the sheet-like member and is longer than the width of the housing adjacent said axle so that it will contact the lower extremities of the housing to thereby prevent insertion of the lower portion of the shield into the housing.

4. The invention defined in claim 2 further characterized by the sheet-like member having a transverse horizontal stiffener fixedly connected to the member intermediate the upper and lower tubular portions.

5. The invention defined in claim 4 in which the transverse horizontal stiffener is a stiffener rod extending through a horizontal tubular section intermediate the upper and lower tubular portions.

6. The invention defined in claim 2 in which the vertical dimension of the shield is greater than the distance between the axle structure and the ground.

7. A method of making and supporting a safety shield on a mower having a driven rear axle comprising: extruding a sheet of elastomer material with vertically spaced tubular sections; cutting said sheets in lengths substantially equal to the axle length; forming notches that extend through the uppermost tubular section downwardly into the sheet; hanging the shield on the axle by insertion of the latter through the upper of said tubular sections and so that the respective notches are aligned with portions of the mower adjacent the axle; and inserting stiffener means through the lower of the tubular sections.

* * * * *